United States Patent
Takagi

(10) Patent No.: US 10,073,665 B2
(45) Date of Patent: Sep. 11, 2018

(54) IMAGE FORMING APPARATUS THAT ENSURES IMPROVED VARIETY OF EXECUTION RESTRICTION OF PROCESSING INCLUDING CHARGE IN IMAGE FORMING APPARATUS AND RECORDING MEDIUM THEREFOR

(71) Applicant: Kyocera Document Solutions Inc., Osaka (JP)

(72) Inventor: Jumpei Takagi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/607,705

(22) Filed: May 30, 2017

(65) Prior Publication Data

US 2017/0344324 A1  Nov. 30, 2017

(30) Foreign Application Priority Data

May 30, 2016  (JP) .................................. 2016-107375

(51) Int. Cl.
*G06K 7/10* (2006.01)
*G06F 3/12* (2006.01)

(52) U.S. Cl.
CPC .......... *G06F 3/1273* (2013.01); *G06F 3/1218* (2013.01)

(58) Field of Classification Search
CPC .............................. G06F 3/1273; G06F 3/1218
USPC ........................................ 235/462.01, 462.18
See application file for complete search history.

(56) References Cited

U.S. PATENT DOCUMENTS

| | | | | |
|---|---|---|---|---|
| 7,315,713 B2* | 1/2008 | Parry | ..................... | G03G 15/50 399/10 |
| 2005/0082371 A1* | 4/2005 | Schmidt | ................... | G06K 7/10 235/462.45 |
| 2005/0175240 A1* | 8/2005 | Parry | ..................... | G03G 15/50 382/182 |
| 2006/0221387 A1* | 10/2006 | Swift | ..................... | G06Q 10/06 358/1.15 |

FOREIGN PATENT DOCUMENTS

JP  2006-185177 A  7/2006
JP  2011-211303 A  10/2011

* cited by examiner

*Primary Examiner* — Paultep Savusdiphol
(74) *Attorney, Agent, or Firm* — James Judge

(57) ABSTRACT

An image forming apparatus includes a management application and a common application. The management application manages a counter. The common application is other than the management application. The management application causes the image forming apparatus to function as: a counter managing unit that manages the counter that counts a count of executions of specific processing by the common application; and an execution count unit that counts the count of executions using the counter managed by the counter managing unit.

3 Claims, 10 Drawing Sheets

| User A | 35 |
| --- | --- |
| User B | 16 |
| . | . |
| . | . |
| . | . |
| Sum | 452 |

| User A | 104 |
| User B | 59 |
| . | . |
| . | . |
| . | . |
| Sum | 1057 |

FIG. 3

IMAGE FORMING APPARATUS THAT ENSURES IMPROVED VARIETY OF EXECUTION RESTRICTION OF PROCESSING INCLUDING CHARGE IN IMAGE FORMING APPARATUS AND RECORDING MEDIUM THEREFOR

INCORPORATION BY REFERENCE

This application is based upon, and claims the benefit of priority from, corresponding Japanese Patent Application No. 2016-107375 filed in the Japan Patent Office on May 30, 2016, the entire contents of which are incorporated herein by reference.

BACKGROUND

Unless otherwise indicated herein, the description in this section is not prior art to the claims in this application and is not admitted to be prior art by inclusion in this section.

There is known a typical image forming apparatus that counts the number of executions of specific processing, such as: the number of executions of a printing process of one page; the number of executions of the printing process of one paper sheet; the number of executions of a color printing process of one paper sheet; the number of executions of a copying process of one paper sheet; and the number of executions of a scanning process of one paper sheet, so as to execute charge and execution restriction of processing.

SUMMARY

An image forming apparatus according to one aspect of the disclosure includes a management application and a common application. The management application manages a counter. The common application is other than the management application. The management application causes the image forming apparatus to function as: a counter managing unit that manages the counter that counts a count of executions of specific processing by the common application; and an execution count unit that counts the count of executions using the counter managed by the counter managing unit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 3 illustrates one example of a scanned page counter as a counter according to the one embodiment.

DETAILED DESCRIPTION

Figure 1:
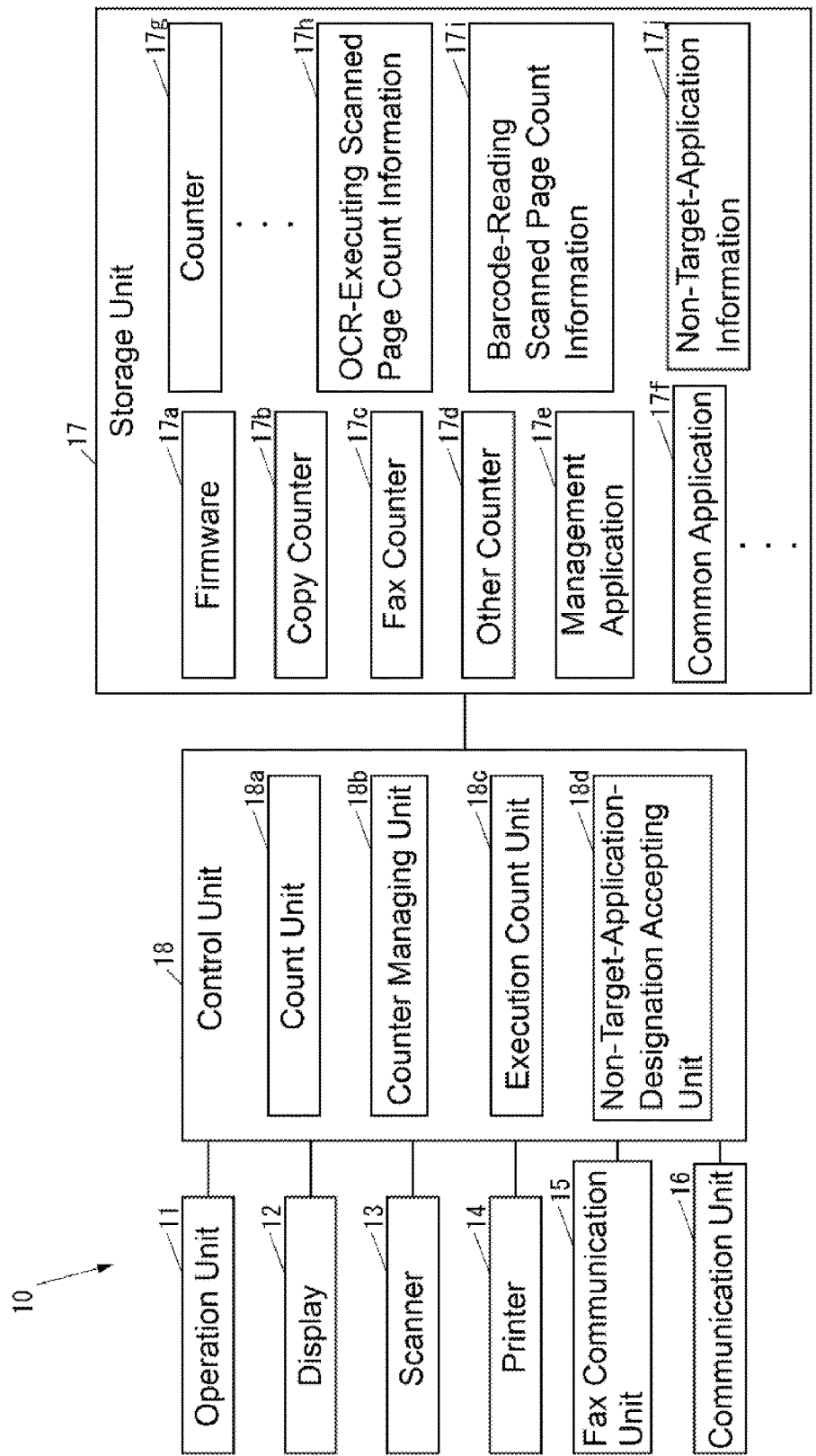
FIG. 1 illustrates a block diagram illustrating an MFP according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to the drawings.

First, the following describes a configuration of a multi-function peripheral (MFP) as an image forming apparatus according to the embodiment.

FIG. 1 illustrates a block diagram illustrating an MFP 10 according to the embodiment.

The MFP 10 includes an operation unit 11, a display 12, a scanner 13, a printer 14, a fax communication unit 15, a communication unit 16, a storage unit 17, and a control unit 18 as illustrated in FIG. 1. The operation unit 11 is an input device such as, a button, which receives various operations. The display 12 is a display device such as, a liquid crystal display (LCD), which displays various pieces of information. The scanner 13 is a reading device that reads an image from an original document. The printer 14 is a print device that prints an image on a recording medium such as paper sheet. The fax communication unit 15 is a fax device that performs fax communications with an external facsimile device (not illustrated) via a communication line such as a dial-up line. The communication unit 16 is a communication device that communicates with an external device via a network, such as the Internet or local area network (LAN), or executes wired communication or wireless communication to directly communicate with the external device without via the network. The storage unit 17 is a non-volatile storage device, which stores various information, such as a semiconductor memory or a hard disk drive (HDD). The control unit 18 controls the whole MFP 10.

The scanner 13 includes an automatic document feeder (ADF).

The storage unit 17 stores firmware 17a. The firmware 17a may be installed in the MFP 10 at production stage of the MFP 10, may be additionally installed in the MFP 10 from an external storage medium such as an SD card or a universal serial bus (USB) memory, or may be additionally installed in the MFP 10 from the network.

The storage unit 17 stores a copy counter 17b, a fax counter 17c, and another counter 17d as a counter related to scanning, that is, an operation where the scanner 13 reads an image from an original document. The copy counter 17b is a counter for counting the number of pages of copying, that is, an operation where the printer 14 prints the image read from the original document by the scanner 13 on a recording medium. The fax counter 17c is a counter for counting the number of pages of facsimile transmission, that is, an operation where the fax communication unit 15 transmits the image read from the original document by the scanner 13 with FAX. The other counter 17d is a counter for counting the number of pages on which specific operations other than copying and facsimile transmission is executed. Here, the specific operation includes, for example, an operation where the storage unit 17 stores the image read from the original document by the scanner 13, and an operation where the image read from the original document by the scanner 13 is transmitted with e-mail or server message block (SMB).

Figure 2:
FIG. 2 illustrates one example of a copy counter according to the one embodiment.

FIG. 2 illustrates one example of the copy counter 17b.

As illustrated in FIG. 2, the copy counter 17b includes the number of copied pages for respective users and a sum of the number of copied pages of all the users.

The fax counter 17c and the other counter 17d also have a configuration similar to the copy counter 17b.

As illustrated in FIG. 1, the storage unit 17 ensures storing a management application 17e and a plurality of common applications 17f. The management application 17e is an application for controlling the counters. The common application 17f is an application other than the management application 17e. The management application 17e and the common application 17f may be installed in the MFP 10 at production stage of the MFP 10, may be additionally installed in the MFP 10 from an external storage medium such as an SD card or a universal serial bus (USB) memory, or may be additionally installed in the MFP 10 from the network. For example, the management application 17e and the common application 17f are created by an identical service provider different from a manufacturer of the MFP 10.

An example of the common applications 17f is an expensing-request workflow app for transmitting, to a specified destination, an image scanned by the scanner 13 from a document for requesting expenses ("expensing-request form" hereinafter). Apart from the expensing-request workflow app, applications for executing a variety of operations can be created as the common applications 17f.

The storage unit 17 is enabled for storing a plurality of various counters 17g for the counting of execution repetitions of specified processes, according to the common applications 17f. Examples of the counters 17g are: a scanned page counter for counting the number of pages on which scanning by a common application 17f has been executed; a common-application-execution-job counter for counting execution repetitions of jobs executed by a common application 17f; an OCR page counter for counting the number of pages on which a common application 17f executes optical character recognition (OCR), that is, a process that recognizes characters contained in an image read from the original document by the scanner 13; an OCR character counter for counting the number of characters OCR-executed by the common application 17f; a barcode-reading page counter for counting the number of pages on which barcode reading—that is, a process that recognizes a barcode contained in an image read from an original document by the scanner 13—has been executed by a common application 17f; and a barcode reading counter for counting execution repetitions of barcode reading by the common application 17f.

Figure 3:
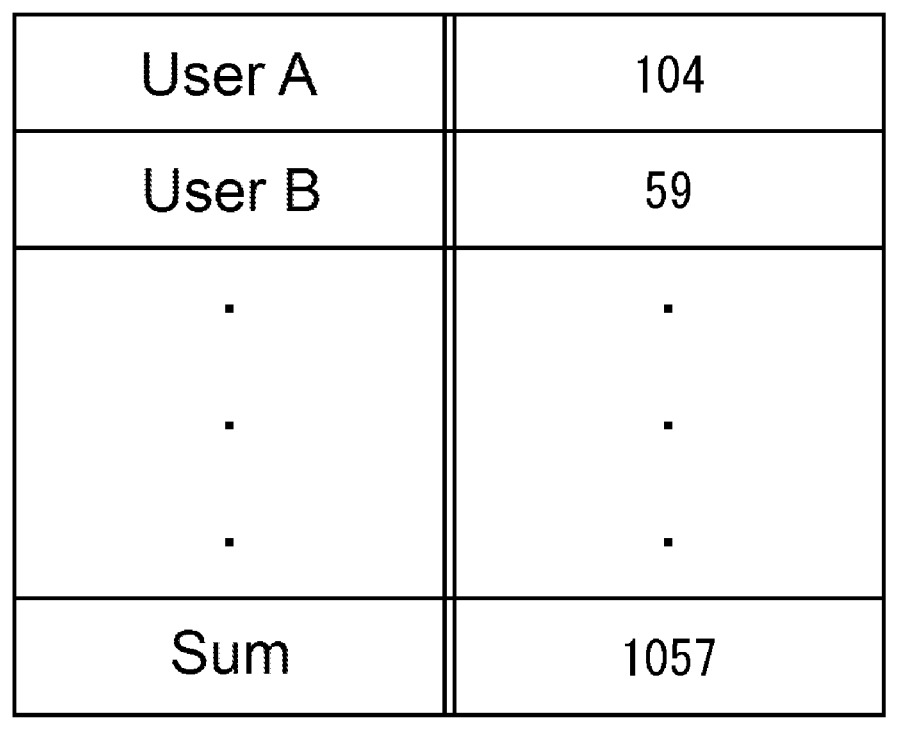

FIG. 3 illustrates one example of the scanned page counter.

As illustrated in FIG. 3, the scanned page counter includes the number of pages for respective users and a sum of the number of pages of all the users, as the number of pages scanned by the common application 17f.

The common-application-execution-job counter, the OCR page counter, the OCR character counter, the barcode reading page counter, and the barcode reading counter also have a configuration similar to the scanned page counter.

As illustrated in FIG. 1, the storage unit 17 is enabled to store OCR-executing scanned page count information 17h, indicating how much pages' worth of scanning to count, during counting by the scanned pages counter, a single page's worth OCR-executed by the common application 17f, and barcode-reading scanned page count information 17i indicating how much pages' worth of scanning to count, during counting by the scanned pages counter, a single page's worth barcode-executed by the common application 17f.

The storage unit 17 ensures storing non-target-application information 17j indicative of the common application 17f, which is not a target for the number of executions counted by the counter 17g.

The control unit 18 includes, for example, a central processing unit (CPU), a read-only memory (ROM), and a random-access memory (RAM). The ROM stores programs and various kinds of data. The RAM is used as a work area of the CPU. The CPU executes the programs stored in the ROM or the storage unit 17.

The control unit 18 executes the firmware 17a stored in the storage unit 17 to function as a count unit 18a that uses the copy counter 17b, the fax counter 17c, and the other counter 17d to count the number of executions of various operations.

The control unit 18 executes the management application 17e stored in the storage unit 17 to function as a counter managing unit 18b, an execution count unit 18c, and a non-target-application-designation accepting unit 18d. The counter managing unit 18b manages the counter 17g. The execution count unit 18c counts the number of executions using the counter 17g managed by the counter managing unit 18b. The non-target-application-designation accepting unit 18d accepts designation of the common application 17f, which is not a target for the number of executions counted by the counter 17g.

Next, the following describes an operation of the MFP 10.

First, the following describes an operation of the MFP 10 when the counter 17g is configured.

Figure 4:
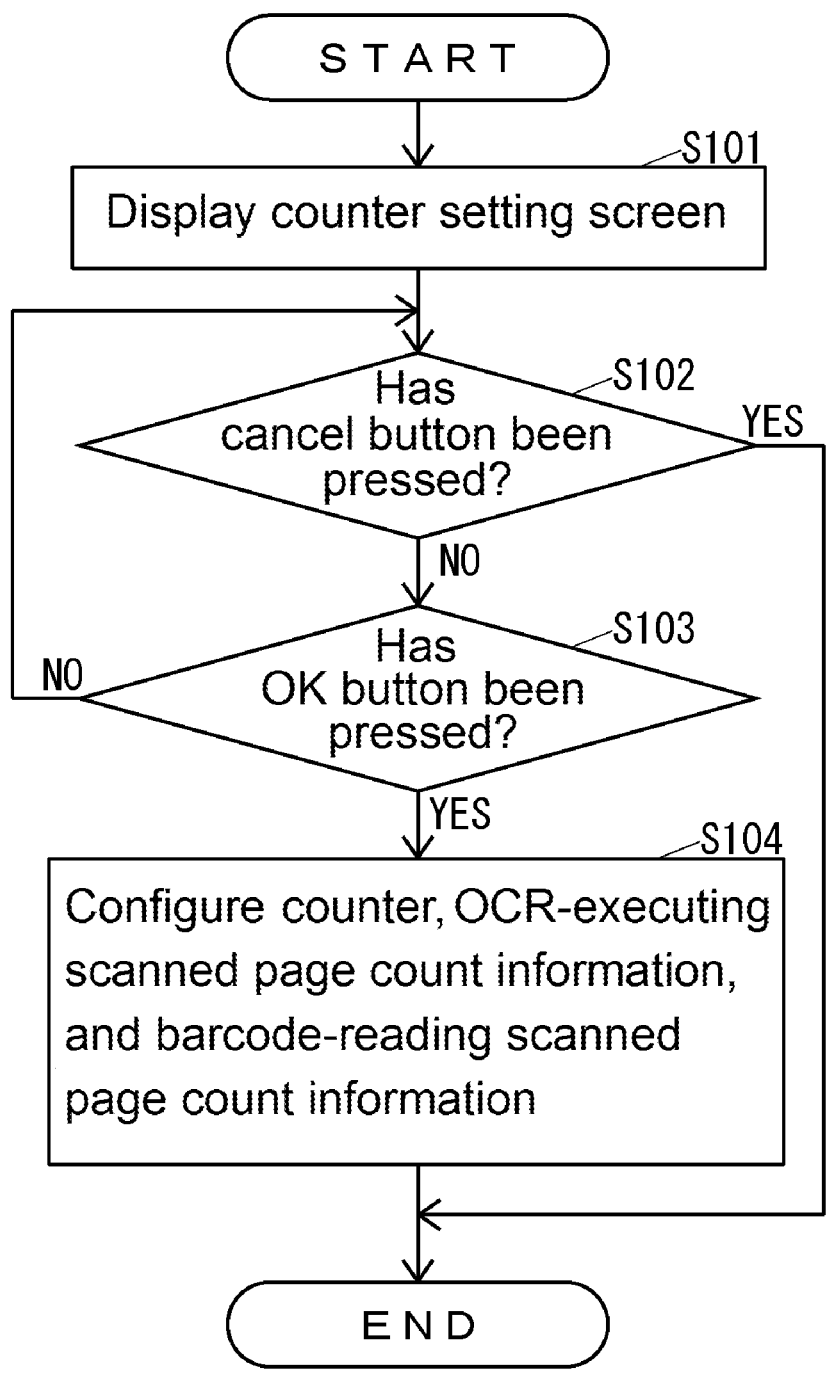
FIG. 4 illustrates an operation of the MFP according to the one embodiment when the counter is configured.

FIG. 4 illustrates the operation of the MFP 10 when the counter 17g is configured.

The control unit 18 executes the operation illustrated in FIG. 4 when a start of the configuration of the counter 17g is instructed. However, the control unit 18 ensures executing the operation illustrated in FIG. 4 only when the service provider of the management application 17e is logged in the MFP 10.

As illustrated in FIG. 4, the counter managing unit 18b displays a counter setting screen 20 (see FIG. 5) for configuring the counter 17g on the display 12 (Step S101).

Figure 5:
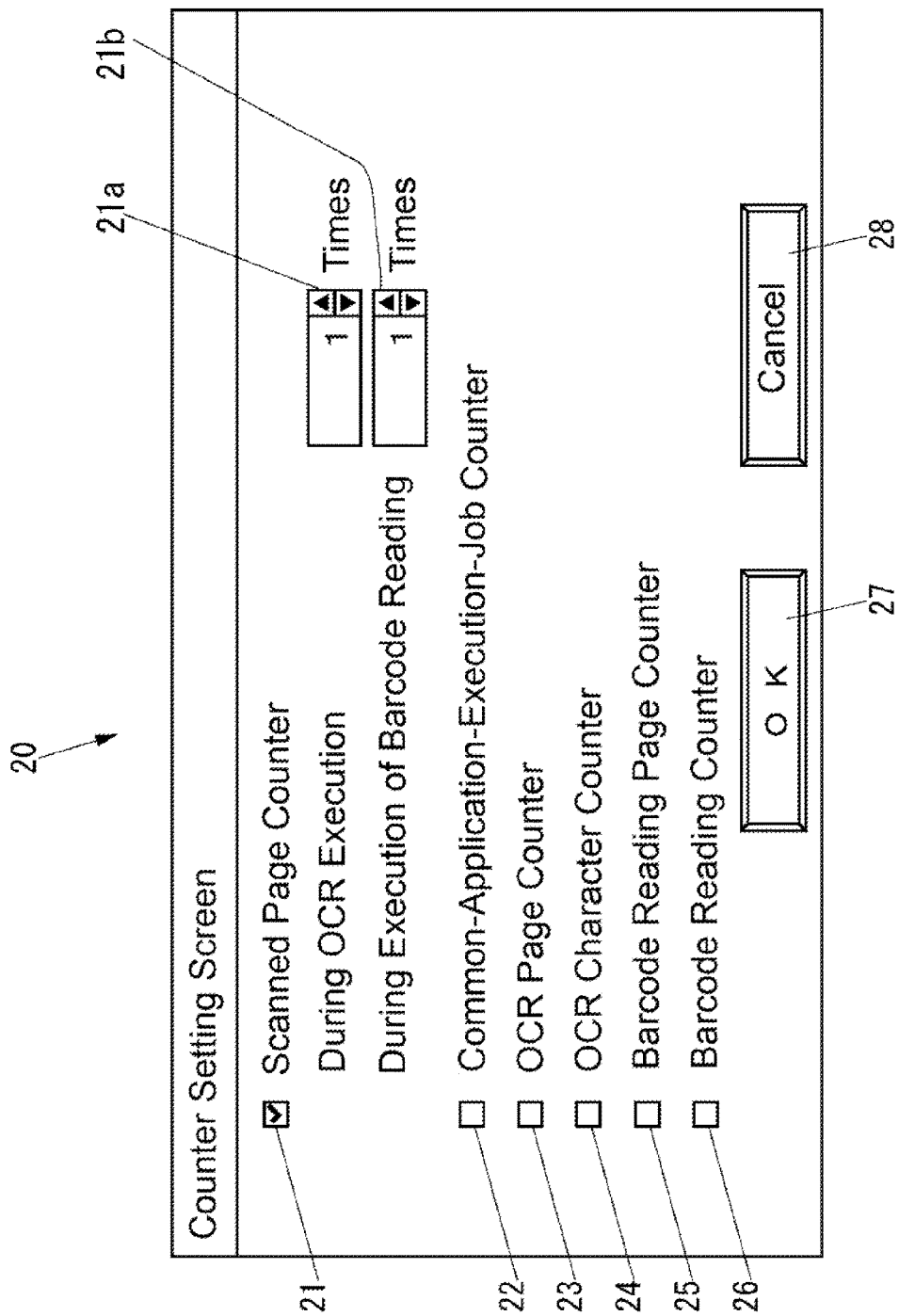
FIG. 5 illustrates one example of a counter setting screen displayed in the operation illustrated in FIG. 4.

FIG. 5 illustrates one example of the counter setting screen 20.

As illustrated in FIG. 5, the counter setting screen 20 includes check boxes 21 to 26. The check box 21 is a check box for configuring the scanned page counter. The check box 22 is a check box for configuring the common-application-execution-job counter. The check box 23 is a check box for configuring the OCR page counter. The check box 24 is a check box for configuring the OCR character counter. The check box 25 is a check box for configuring the barcode reading page counter. The check box 26 is a check box for configuring the barcode reading counter. The scanned page counter, the common-application-execution-job counter, the OCR page counter, the OCR character counter, the barcode reading page counter, and the barcode reading counter are examples. The counter setting screen 20 may include a check box for configuring the counter 17g other than the scanned page counter, the common-application-execution-job counter, the OCR page counter, the OCR character counter, the barcode reading page counter, and the barcode reading counter.

The counter setting screen 20 includes a spin box 21a and a spin box 21b. The spin box 21a is a spin box for configuring the OCR-executing scanned page count information 17h. The spin box 21b is a spin box for configuring the barcode-reading scanned page count information 17i. The spin box 21a and the spin box 21b ensure the configuration of only a positive integer. The number configured by the spin box 21a is fixed to "1" when the check box 23 for configuring the OCR page counter is checked. The number configured by the spin box 21b is fixed to "1" when the check box 25 for configuring the barcode reading page counter is checked.

The counter setting screen 20 includes an OK button 27 and a cancel button 28. The OK button 27 is a button for accepting a configuration by the check boxes 21 to 26, and the spin boxes 21a and 21b. The cancel button 28 is a button for aborting the acceptance of the configuration by the check boxes 21 to 26 and the spin boxes 21a and 21b.

As illustrated in FIG. 4, the counter managing unit 18b determines whether the cancel button 28 has been pressed or not (Step S102).

When the counter managing unit 18b determines that the cancel button 28 has been pressed at Step S102, the counter managing unit 18b terminates the operation illustrated in FIG. 4.

When the counter managing unit 18b determines that the cancel button 28 has not been pressed at Step S102, the counter managing unit 18b determines whether the OK button 27 has been pressed or not (Step S103).

When the counter managing unit 18b determines that the OK button 27 has not been pressed at Step S103, the counter managing unit 18b executes the process of Step S102.

When the counter managing unit 18b determines that the OK button 27 has been pressed at Step S103, the counter managing unit 18b configures the counter 17g, the OCR-executing scanned page count information 17h, and the barcode-reading scanned page count information 17i in accordance with the configuration by the check boxes 21 to 26 and the spin boxes 21a and 21b (Step S104). For example, when the counter managing unit 18b does not store the counter 17g configured by the check box 21 to 26, the counter managing unit 18b newly creates the counter 17g in the storage unit 17. On the other hand, when the counter managing unit 18b stores the counter 17g that is not configured by the check boxes 21 to 26, the counter managing unit 18b deletes the counter 17g from the storage unit 17.

After a termination of the process of Step S104, the counter managing unit 18b terminates the operation illustrated in FIG. 4.

As described above, the MFP 10 accepts the configuration through the counter setting screen 20. However, the service provider of the management application 17e may execute these configurations from a remote location via the communication unit 16.

The management application 17e may include these configurations from the beginning. That is, the service provider of the management application 17e may provide the management application 17e including these configurations for a user of the MFP 10.

Next, the following describes an operation of the MFP 10 when the designation of the common application 17f, which is not a target for the number of executions counted by the counter 17g, is accepted.

Figure 6:
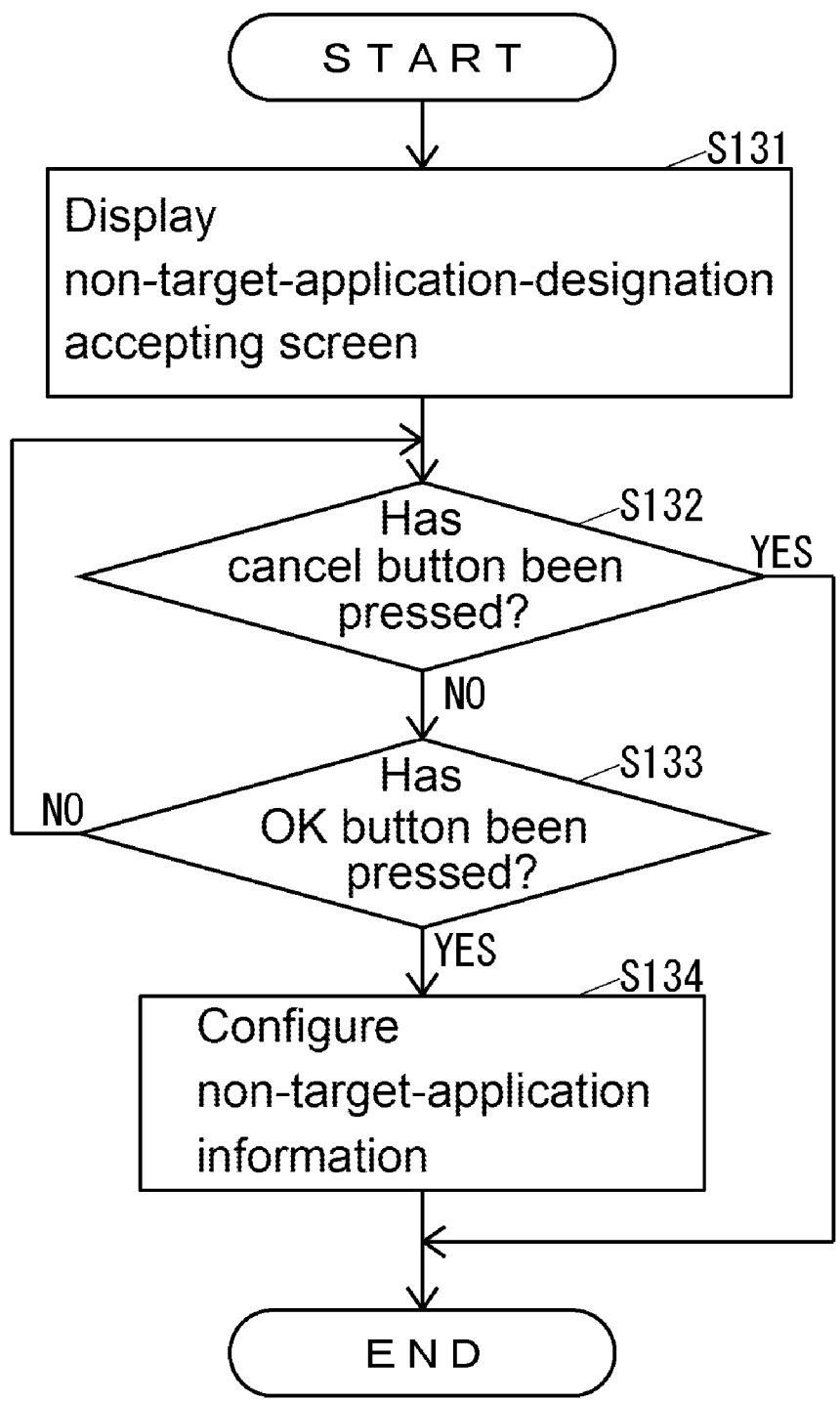
FIG. 6 illustrates an operation of the MFP according to the one embodiment when designation of a common application, which is not a target for the number of executions counted by the counter, is accepted.

FIG. 6 illustrates the operation of the MFP 10 when the designation of the common application 17f, which is not a target for the number of executions counted by the counter 17g, is accepted.

When a start of the acceptance of designating the common application 17f, which is not a target for the number of executions counted by the counter 17g, is instructed, the control unit 18 executes the operation illustrated in FIG. 6. However, the control unit 18 ensures executing the operation illustrated in FIG. 6 only when the service provider of the management application 17e is logged in the MFP 10.

As illustrated in FIG. 6, the non-target-application-designation accepting unit 18d displays a non-target-application-designation accepting screen 30 (see FIG. 7) for accepting designation of the common application 17f, which is not a target for the number of executions counted by the counter 17g, on the display 12 (Step S131).

Figure 7:
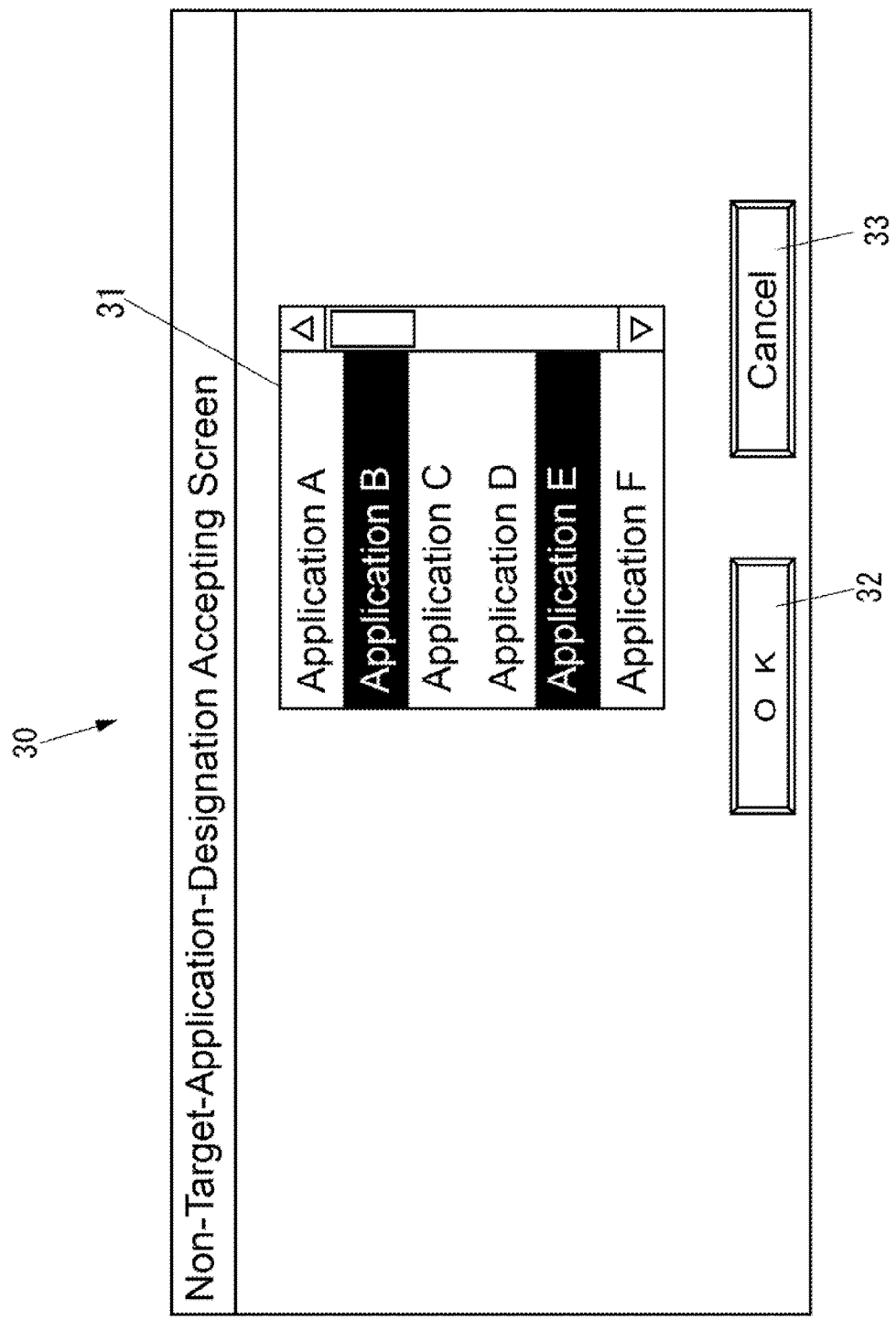
FIG. 7 illustrates one example of a non-target-application-designation accepting screen displayed in the operation illustrated in FIG. 6.

FIG. 7 illustrates one example of the non-target-application-designation accepting screen 30.

As illustrated in FIG. 7, the non-target-application-designation accepting screen 30 includes a list box 31 for designating the common application 17f, which is not a target for the number of executions counted by the counter 17g. While in the example illustrated in FIG. 7 applications A to F are illustrated as the common application 17f, a name of the common application 17f is actually displayed in the list box 31. The list box 31 ensures the designation of the plurality of common applications 17f.

The non-target-application-designation accepting screen 30 includes an OK button 32 and a cancel button 33. The OK button 32 is a button for accepting designation in the list box 31. The cancel button 33 is a button for aborting the acceptance of the designation in the list box 31.

As illustrated in FIG. 6, the non-target-application-designation accepting unit 18d determines whether the cancel button 33 has been pressed or not (Step S132).

When the non-target-application-designation accepting unit 18d determines that the cancel button 33 has been pressed at Step S132, the non-target-application-designation accepting unit 18d terminates the operation illustrated in FIG. 6.

When the non-target-application-designation accepting unit 18d determines that the cancel button 33 has not been pressed at Step S132, the non-target-application-designation accepting unit 18d determines whether the OK button 32 has been pressed or not (Step S133).

When the non-target-application-designation accepting unit 18d determines that the OK button 32 has not been pressed at Step S133, the non-target-application-designation accepting unit 18d executes the process of Step S132.

When the non-target-application-designation accepting unit 18d determines that the OK button 32 has been pressed at Step S133, the non-target-application-designation accepting unit 18*d* configures the non-target-application information 17*j* in accordance with the designation in the list box 31 (Step S134).

After a termination of the process of Step S134, the non-target-application-designation accepting unit 18*d* terminates the operation illustrated in FIG. 6.

As described above, the MFP 10 accepts the configuration on the non-target-application-designation accepting screen 30. However, the service provider of the management application 17*e* may execute these configurations from a remote location via the communication unit 16.

The management application 17*e* may include these configurations from the beginning. That is, the service provider of the management application 17*e* provides the management application 17*e* including these configurations for the user of the MFP 10.

Next, the following describes an operation of the count unit 18*a*.

After the user logs in the MFP 10, the user can instruct the MFP 10 to execute copying via the operation unit 11. When the execution of the copying is instructed, the control unit 18 executes the copying.

Figure 8:
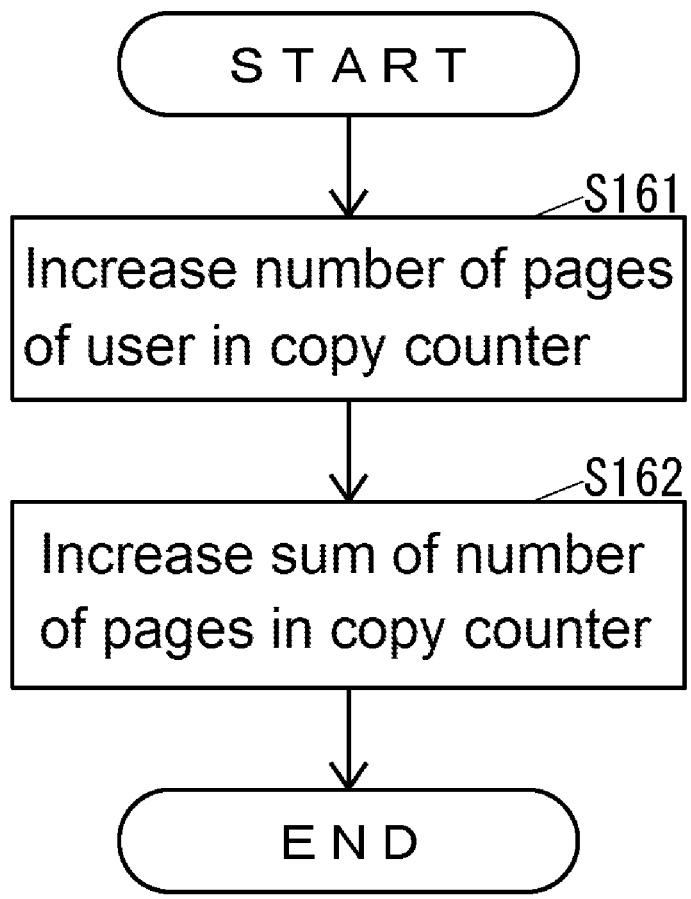
FIG. 8 illustrates an operation of a count unit according to the one embodiment when copying is executed.

FIG. 8 illustrates an operation of the count unit 18*a* when the copying is executed.

When the copying is executed, the count unit 18*a* executes the operation illustrated in FIG. 8.

As illustrated in FIG. 8, the count unit 18*a* increases the number of pages of the user who has instructed the execution of the copying among the number of pages in the copy counter 17*b* by the number of pages on which the copying is executed (Step S161).

Next, the count unit 18*a* increases the sum of the number of pages of all the users among the number of pages in the copy counter 17*b* by the number of pages on which the copying is executed (Step S162).

After the process of Step S162, the count unit 18*a* terminates the operation illustrated in FIG. 8.

The above has described the operation of the count unit 18*a* for the copy counter 17*b* when the copying is executed. However, the same applies to an operation of the count unit 18*a* for the fax counter 17*c* when the facsimile transmission is executed, and an operation of the count unit 18*a* for the other counter 17*d* when a specific operation other than the copying and the facsimile transmission is executed.

Next, the following describes an operation of the MFP 10 when the common application 17*f* is executed.

After the user logs in the MFP 10, the user can instruct the MFP 10 to execute the common application 17*f* via the operation unit 11. When the execution of the common application 17*f* is instructed, the control unit 18 executes the common application 17*f*.

Figure 9:
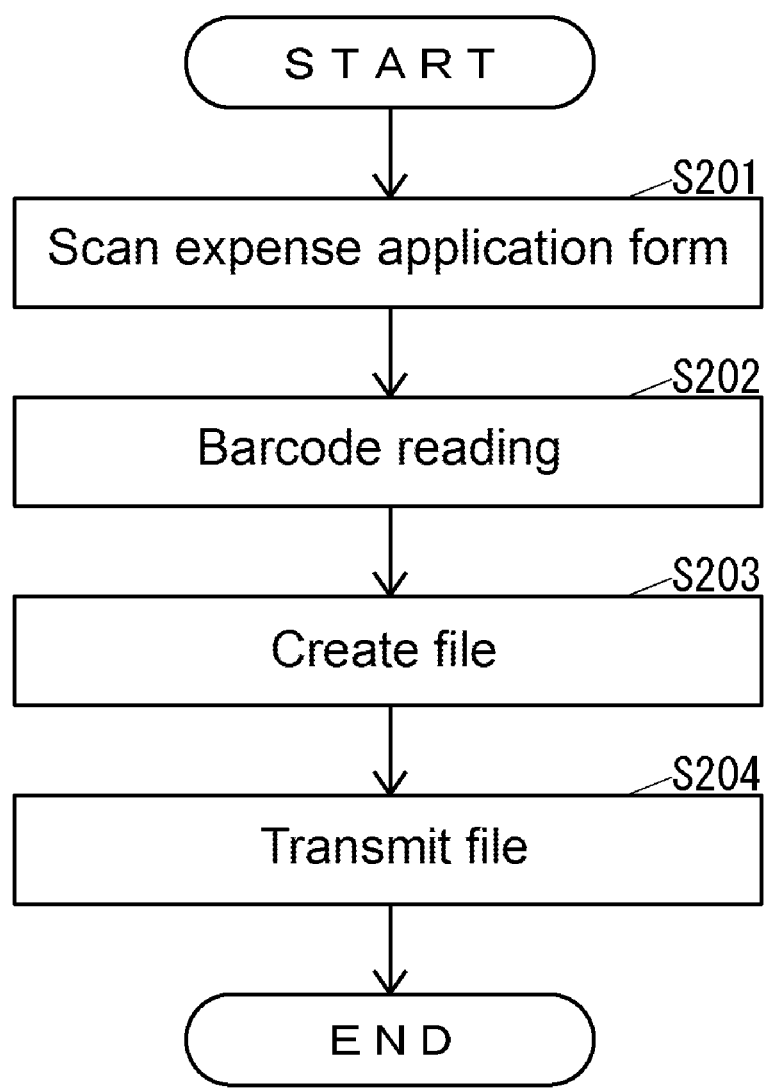
FIG. 9 illustrates an operation of the MFP according to the one embodiment when an expense application workflow application as a common application is executed.

FIG. 9 illustrates an operation of the MFP 10 when the expense application workflow application as the common application 17*f* is executed.

Before the user executes the expense application workflow application, the user fills in required items in one set of the expense application form with the printer 14 or by hand, and then puts the one set of the expense application form, which the user has filled in the required items, on the ADF of the scanner 13. Here, a paper sheet of the expense application form includes three sheets as the one set, and a barcode is attached on one of the three sheets. This barcode indicates a serial number for identifying the expense application form, and is attached on each expense application form by, for example, a person (hereinafter referred to as an "application form distributor") who distributes the paper sheet of the expense application form to the user.

As illustrated in FIG. 9, the control unit 18 causes the scanner 13 to scan one set of the expense application form (Step S201).

Next, the control unit 18 reads the barcode included in the image read from the expense application form to recognizes the barcode at Step S201 (Step S202). This causes the control unit 18 to obtain the serial number indicated by the barcode.

After the process of Step S202, the control unit 18 creates a file of the image read from the expense application form at Step S201, and the serial number obtained at Step S202 is used as a file name (Step S203).

Next, the control unit 18 transmits the file created at Step S203 to a destination, which is configured in the expense application workflow application, such as an e-mail address of the application form distributor (Step S204), and terminates the operation illustrated in FIG. 9.

Thus, the application form distributor is allowed to receive an expense application as image data from the user. Here, the application form distributor is allowed to recognize which expense application form has been already used, and which expense application form has not been used yet on the basis of the serial number corresponding to a file name of the received file. Further, when the application form distributor remembers which user and which serial number of the expense application form the application form distributor has distributed to, the application form distributor is allowed to recognize which user has already applied for an expense, and which user has not applied for an expense yet on the basis of the serial number.

Next, the following describes an operation of the execution count unit 18*c*.

Figure 10:
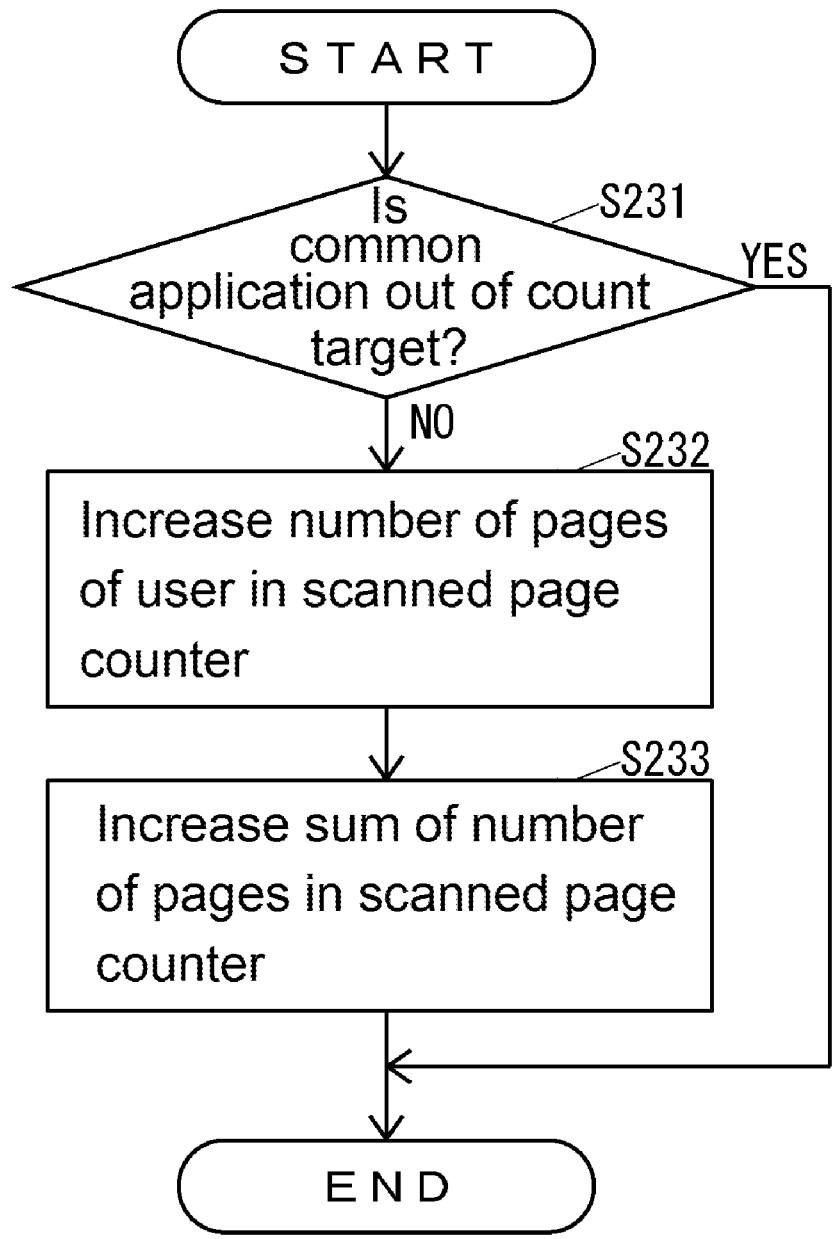
FIG. 10 illustrates an operation of an execution count unit according to the one embodiment when the common application executes scanning.

FIG. 10 illustrates an operation of the execution count unit 18*c* when the common application 17*f* executes scanning.

When the common application 17*f* executes the scanning, the execution count unit 18*c* executes the operation illustrated in FIG. 10.

As illustrated in FIG. 10, the execution count unit 18*c* determines whether the common application 17*f*, which is not a target for the number of executions counted by the counter 17*g*, has been executed or not on the basis of the non-target-application information 17*j* (Step S231).

When the execution count unit 18*c* determines that one other than the common application 17*f*, which is not a target for the number of executions counted by the counter 17*g*, has been executed at Step S231, the execution count unit 18*c* increases the number of pages of the user who has instructed the execution of the common application 17*f* among the number of pages in the scanned page counter by the number of pages scanned by the common application 17*f* (Step S232).

Next, the execution count unit 18*c* increases the sum of the number of pages of all the users among the number of pages in the scanned page counter by the number of pages scanned by the common application 17*f* (Step S233).

When the execution count unit 18*c* determines that the common application 17*f*, which is not a target for the number of executions counted by the counter 17*g*, has been executed at Step S231 or after the process of Step S233, the execution count unit 18*c* terminates the operation illustrated in FIG. 10.

The above has described the operation of the execution count unit 18*c* for the scanned page counter when the common application 17*f* executes the scanning. However, the same applies to: an operation of the execution count unit 18*c* for the common-application-execution-job counter when the common application 17*f* is executed; an operation of the execution count unit 18c for the OCR page counter and the OCR character counter when the common application 17f executes the OCR; and an operation of the execution count unit 18c for the barcode reading page counter and the barcode reading counter when the common application 17f executes the barcode reading.

For example, when the expense application workflow application illustrated in FIG. 9 is executed once as the common application 17f in a state where the common-application-execution-job counter is stored in the storage unit 17, the execution count unit 18c increases each of: the number of executions of the user who has instructed the execution of the expense application workflow application; and a sum of the number of executions of all the users by 1 in the common-application-execution-job counter.

In a state where the scanned page counter is stored in the storage unit 17, when the expense application workflow application illustrated in FIG. 9 is executed once as the common application 17f, and when the barcode-reading scanned page count information 17i indicates 1, as described above, scanning of three pages is executed. This causes the execution count unit 18c to increase each of: the number of pages of the user who has instructed the execution of the expense application workflow application; and the sum of the number of pages of all the users by 3 in the scanned page counter.

However, when the expense application workflow application illustrated in FIG. 9 is executed once as the common application 17f, and when the barcode-reading scanned page count information 17i indicates a number other than 1, the execution count unit 18c adds a sum of pages of: the number of pages obtained by subtracting the number of pages including the barcode from the number of scanned pages; and the number of pages obtained by multiplying the number of pages including the barcode among the number of scanned pages by a number indicated by the barcode-reading scanned page count information 17i to each of: the number of pages of the user who has instructed the execution of the expense application workflow application; and the sum of the number of pages of all the users in the scanned page counter. For example, when the expense application workflow application illustrated in FIG. 9 is executed once as the common application 17f, and when the barcode-reading scanned page count information 17i indicates 3, the execution count unit 18c adds 5 as the sum of pages of: 2 as "the number of pages found by subtracting 1 as the number of pages including the barcode from 3 as the number of scanned pages;" and 3 as "the number of pages obtained by multiplying 1 as the number of pages including the barcode among the number of scanned pages by 3 as the number indicated by the barcode-reading scanned page count information 17i" to each of: the number of pages of the user who has instructed the execution of the expense application workflow application; and the sum of the number of pages of all the users in the scanned page counter.

In a state where the barcode reading page counter is stored in the storage unit 17, when the expense application workflow application illustrated in FIG. 9 is executed once as the common application 17f, the barcode reading is executed once as described above, and this causes the execution count unit 18c to increase each of: the number of executions of the user who has instructed the execution of the expense application workflow application; and a sum of the number of executions of all the users by 1 in the barcode reading page counter.

When the expense application workflow application illustrated in FIG. 9 is executed once as the common application 17f, the scanning of the three page is executed as described above, and this causes the count unit 18a to increase each of: the number of pages of the user who has instructed the execution of the expense application workflow application; and the sum of the number of pages of all the users by 3 in the other counter 17d.

As described above, the MFP 10 causes the management application 17e to manage the counter 17g for counting the number of executions of specific processing by the common application 17f. Thus, installation of the management application 17e ensures the improved variety of charge and execution restriction of processing.

For example, the MFP 10 manages the common-application-execution-job counter as the counter 17g for counting the number of jobs executed by the common application 17f. This causes the common-application-execution-job counter to ensure the improved variety of a charge and execution restriction of processing.

The MFP 10 manages the OCR page counter and the OCR character counter as the counter 17g for counting the number of OCR executions, causing the OCR page counter and the OCR character counter to ensure the improved variety of a charge and execution restriction of processing. For example, the service provider of the common application 17f can charge not only for the number of executions of ordinary scanning but also for the number of executions of more value-added OCR than the ordinary scanning.

When the number indicated by the OCR-executing scanned page count information 17h is 2 or more, and when the MFP 10 includes the scanned page counter for counting the number of scanning executions, it is not necessary for the MFP 10 to include the OCR page counter, that is, the counter exclusive for counting the number of OCR executions. This ensures the reduced storage capacity for the counter 17g. Further, the number indicated by the OCR-executing scanned page count information 17h is 2 or more. This causes the MFP 10 to put importance on the number of OCR executions over the number of executions of the ordinary scanning, so as to ensure the execution of charge and execution restriction of processing.

The MFP 10 manages the barcode reading page counter and the barcode reading counter as the counter 17g for counting the number of executions of the barcode reading. This causes the barcode reading page counter and the barcode reading counter to ensure the improved variety of a charge and execution restriction of processing. For example, the service provider of the common application 17f can charge not only for the number of executions of ordinary scanning but also for the number of executions of more value-added barcode reading than the ordinary scanning.

When the number indicated by the barcode-reading scanned page count information 17i is 2 or more, and when the MFP 10 includes the scanned page counter for counting the number of scanning executions, it is not necessary for the MFP 10 to include the barcode reading counter, that is, the counter exclusive for counting the number of executions of the barcode reading. This ensures the reduced storage capacity for the counter 17g. Further, the number indicated by the barcode-reading scanned page count information 17i is 2 or more. This causes the MFP 10 to put importance on the number of executions of the barcode reading over the number of executions of the ordinary scanning, so as to ensure the execution of a charge and execution restriction of processing.

The MFP 10 accepts the designation of the common application 17f, which is not a target for the number of executions counted by the counter 17g, thus ensuring the improved variety of charge and execution restriction of processing. For example, the service provider of the common application 17f configures the MFP 10 such that the MFP 10 does not charge for use of the common application 17f, for which the MFP 10 actually charges, as a trial edition of the common application 17f.

While the image forming apparatus of the disclosure is an MFP in the embodiment, an image forming apparatus other than an MFP, such as a scanner-only machine and a copy-only machine, may be employed.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus comprising:
   a scanner for reading images from original documents; and
   a storage unit including
      a counter-managing application, and
      common applications, other than the management application, including an original-document page-scanning common application, an optical-character-recognition-(OCR-)executing common application, and a barcode-reading common application,
      a plurality of counters including a scanned pages counter for counting original-document image pages scanned by the page-scanning common application, an OCR page counter for counting pages on which the OCR-executing common application executes OCR, an OCR character counter for counting characters OCR-executed by the OCR-executing common application, a barcode-reading page counter for counting pages on which the barcode-reading common application recognizes and reads a barcode, and a barcode-reading counter for counting how many times the barcode-reading common application executes barcode reading, and
      OCR-executing scanned page count information, indicating how much pages' worth of scanning to count, during counting by the scanned pages counter, a single page's worth OCR-executed by the OCR-executing common application, and barcode-reading scanned page count information indicating how much pages' worth of scanning to count, during counting by the scanned pages counter, a single page's worth barcode-read by the barcode-reading common application; wherein
   the counter-managing application manages the plurality of counters, and causes the image forming apparatus to function as
      a counter managing unit for managing counters, among the plurality of counters, that are for counting execution repetitions of processes by the original-document page scanning, OCR-executing, and barcode-reading common applications, and
      an execution count unit for counting execution repetitions according to the counters managed by the counter managing unit;
   for processes by the OCR-executing common application, the execution count unit increases, based on the OCR-executing scanned page count information, the execution repetitions that the execution count unit counts according to one of either the OCR page counter or the OCR character counter, compared to the execution repetitions that the execution count unit counts according to the scanned page counter; and
   for processes by the barcode-reading common application, the execution count unit increases, based on the barcode-reading scanned information, the execution repetitions that the execution count unit counts according to one of either the barcode-reading page counter or the barcode-reading counter, compared to the execution repetitions that the execution count unit counts according to the scanned page counter.

2. The image forming apparatus according to claim 1, wherein the counter-managing application further causes the image forming apparatus to function as a non-target-application-designation accepting unit for accepting designation of a common application being apart from targets for count of execution repetitions according to the counters.

3. For an image forming apparatus comprising a scanner for reading images from original documents, and a storage unit including a counter-managing application and non-managing applications including an original-document page-scanning common application, an optical-character-recognition-(OCR-)executing common application, and a barcode-reading common application, a non-transitory storage medium storing a management application for managing a plurality of counters including a scanned pages counter for counting original-document image pages scanned by the page-scanning common application, OCR page counter for counting pages on which the OCR-executing common application executes OCR, an OCR character counter for counting characters OCR-executed by the OCR-executing common application, a barcode-reading page counter for counting pages on which the barcode-reading common application recognizes and reads a barcode, and a barcode-reading counter for counting how many times the barcode-reading common application executes barcode reading, wherein storage unit further includes OCR-executing scanned page count information, indicating how much pages' worth of scanning to count, during counting by the scanned pages counter, a single page's worth OCR-executed by the OCR-executing common application, and barcode-reading scanned page count information indicating how much pages' worth of scanning to count, during counting by the scanned pages counter, a single page's worth barcode-read by the barcode-reading common application, the management application causing the image forming apparatus to function as:
   a counter managing unit for managing counters, among the plurality of counters, that are for counting execution repetitions of processes by the original-document page scanning, OCR-executing, and barcode-reading common applications; and
   an execution count unit for counting execution repetitions according to the counters managed by the counter managing unit wherein
   for processes by the OCR-executing common application, the execution count unit increases, based on the OCR-executing scanned page count information, the execution repetitions that the execution count unit counts according to one of either the OCR page counter or the OCR character counter, compared to the execution repetitions that the execution count unit counts according to the scanned page counter, and
   for processes by the barcode-reading common application, the execution count unit increases, based on the barcode-reading scanned information, the execution repetitions that the execution count unit counts according to one of either the barcode-reading page counter or the barcode-reading counter, compared to the execution repetitions that the execution count unit counts according to the scanned page counter.

\* \* \* \* \*